United States Patent
Miao et al.

(10) Patent No.: US 9,175,122 B2
(45) Date of Patent: Nov. 3, 2015

(54) PREPARATION METHOD OF HYPERBRANCHED POLYCARBOXYLIC ACID CONTAINING COPOLYMER CEMENT DISPERSANT

(75) Inventors: Changwen Miao, Nanjing (CN); Min Qiao, Nanjing (CN); Qianping Ran, Nanjing (CN); Jianping Liu, Nanjing (CN); Dongliang Zhou, Nanjing (CN); Yong Yang, Nanjing (CN); Yonglin Mao, Nanjing (CN)

(73) Assignee: SOBUTE NEW MATERIALS CO., LTD., Nanjing (CN)

( * ) Notice: Subject to any disclaimer, the term of this patent is extended or adjusted under 35 U.S.C. 154(b) by 377 days.

(21) Appl. No.: 13/807,723

(22) PCT Filed: Dec. 22, 2010

(86) PCT No.: PCT/CN2010/080133
§ 371 (c)(1),
(2), (4) Date: Dec. 29, 2012

(87) PCT Pub. No.: WO2012/083536
PCT Pub. Date: Jun. 28, 2012

(65) Prior Publication Data
US 2013/0102749 A1    Apr. 25, 2013

(51) Int. Cl.
*C08F 228/02*    (2006.01)
*C04B 24/16*    (2006.01)
*C04B 24/26*    (2006.01)
*C04B 103/40*    (2006.01)

(52) U.S. Cl.
CPC ............. *C08F 228/02* (2013.01); *C04B 24/165* (2013.01); *C04B 24/2647* (2013.01); *C04B 2103/408* (2013.01)

(58) Field of Classification Search
CPC .................. C04B 2103/302; C04B 24/2647; C04B 24/267; C08F 216/1416; C08F 220/06; C08F 222/06
USPC .......................................... 524/366; 526/286
See application file for complete search history.

(56) References Cited

U.S. PATENT DOCUMENTS

2010/0105810 A1*  4/2010  Sakamoto et al. ............... 524/3

FOREIGN PATENT DOCUMENTS

CN        101580353 A    11/2009
CN        101602834 A    12/2009

* cited by examiner

*Primary Examiner* — Ling Choi
*Assistant Examiner* — Chun-Cheng Wang
(74) *Attorney, Agent, or Firm* — Treasure IP Group, LLC

(57) ABSTRACT

The present invention provides a preparation method of hyperbranched polycarboxylic acid type copolymer cement dispersant, including: Monomer A, B and C undergo a free radical copolymerization in an aqueous medium. The molar ratio of Monomer A, Monomer B and Monomer C conforms to B/A–A–2–10 and C/(A+B–C)–0.02–0.08. Monomer A is expressed by General Formula (1), where, $R_1$ is H or a methyl; $X_1=O$, $CH_2O$, $CH_2CH_2O$; m is an integer from 5 to 200. Monomer B is expressed by General Formula (2), where, $R_2$ is H or COOM; $R_3$ is H or $CH_3$ and M is H, Na, K or $NH_4$; Monomer C is expressed by General Formula (3), where, $R_4$ is H or methyl; $X_2=O$, $CH_2O$, $CH_2CH_2O$; $Y=CH_2$, $CH_2CH_2$, $CH(CH_3)$, $CH_2CH_2CH_2$, $CH(CH_3)CH_2$, $C(CH_3)_2$ and n is an integer from 5 to 200.

10 Claims, 1 Drawing Sheet

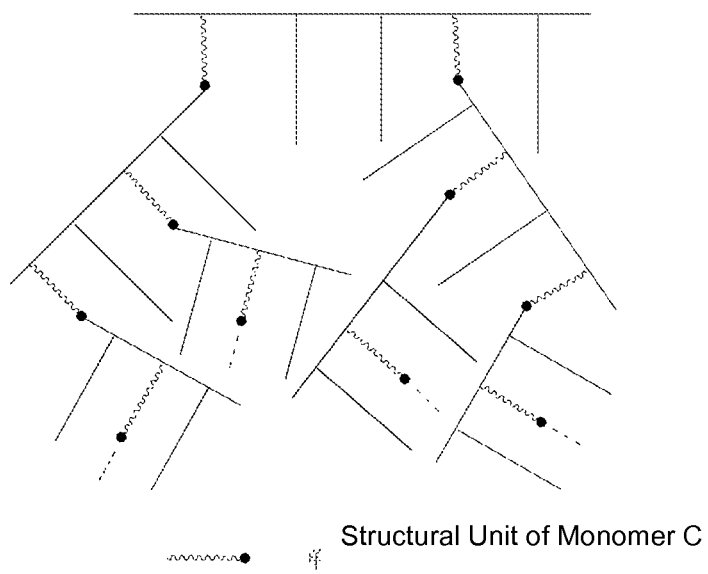

PREPARATION METHOD OF HYPERBRANCHED POLYCARBOXYLIC ACID CONTAINING COPOLYMER CEMENT DISPERSANT

TECHNICAL FIELD

The present invention relates to a preparation method of hyperbranched polycarboxylic acid type copolymer cement dispersant, belonging to the technical field of concrete admixtures.

BACKGROUND OF THE INVENTION

Cement dispersants (water reducers) can be absorbed on cement particles to inhibit the condensation of cement particles and improve the dispersion of concrete in use. There are many substances used as cement dispersant, including lignosulphonate, naphthalene sulfonate/formaldehyde condensation polymer, phenol/p-aminobenzene sulfonic acid/formaldehyde condensation polymer, melamine sulfonate/formaldehyde condensation polymer and comb-shaped polycarboxylic acid type copolymer, etc. From the perspective of the structure, the former cement dispersants mainly take sulfonyl as the absorbing group, so having the disadvantages of lack of effective side chains providing a steric hindrance, simple molecular structure, poor adjustability, limited dispersion effect on cement, high dosage and low water reduction. The comb-shaped polycarboxylic acid type copolymer, with both the main chains rich in absorbing groups providing absorption function and the side chains having good hydrophilicity providing steric hindrance function, can improve the cement's dispersion greatly. Although the comb-shaped polycarboxylic acid type copolymer makes greater improvements in respect of comonomer and copolymerization technology with the development of concrete towards high performance, it still cannot satisfy the needs of modern constructional engineering for the high-performance cement dispersant. To develop polycarboxylic acid type copolymers with new structure has become one direction to improve the performance of polycarboxylic acid type cement dispersant. The new structures, for example, star-shaped, hyperbranched and tree-shaped, not only greatly increase the number of the absorbing groups in the molecular structure of polymer, but enhance the steric hindrance provided by the hydrophilic side chains in the comb-shaped structure. Patent CN101580353 reported a hyperbranched polycarboxylate high-efficiency water reducer and its preparation method. The preparation method includes two step: Step 1, take N,N-dimethylformamide as the dissolvent, and copolymerize acrylic ester, sodium methylacryl sulfonate and allyl polyethenoxy ether sulfate to form the main chain of the polymer, wherein ACVA is used as the initiator and the carboxyls are introduced into the end of the polymer chain; Step 2, graft the hyperbranched polyamide structures to the ends of the main poly-chains by taking advantages of the amidation between the quadrol and the carboxyl, and Michael addition reaction between the amido and the double bonds of acrylic acid successively. Moreover, with the carboxyl at the end of the hyperbranched polyamide structures, the absorbing groups in the molecular structure of the polymer are greatly increased. However, this method can only be used to introduce the hyperbranched structure to both ends of polymer chains, and a high amount of organic solvent N,N-dimethylformamide is required due to complicated synthetic procedure, which results in environmental pollution. In addition, some materials and the initiator are expensive, so the cost is high. Hence, it is imperative to develop a simple, economic, high-performance hyperbranched polycarboxylic acid type copolymer cement dispersant and its preparation method.

BRIEF SUMMARY OF THE INVENTION

To address the problems above, the present invention aims at providing a preparation method of hyperbranched polycarboxylic acid type copolymer cement dispersant, through which the products manufactured feature low dosage, good dispersion, high water reduction and small slump loss.

The inventor of the present invention, on the basis of abundant experiments, found that the sulfhydryl-contained macromonomer may become a chain transfer agent when involving a copolymerization, and the chain transfer action allows various comb-shaped chains of polycarboxylic acid to cross-link, which further causes the formation of a hyperbranched structure. The polycarboxylic acid copolymer with hyperbranched structure provides a better diversification effect due to its stronger absorption to the surface of cement particles comparing with the comb-shaped polycarboxylic acid copolymer.

The inventor of the present invention found that the ester in the hyperbranched structure that is formed by the use of a macromonomer containing both ester and sulfenyl as a comonomer is apt to gradually hydrolyze in the alkaline condition, and slowly release copolymers with relatively low molecular weight and the function of diversification to a water-cement system, supplementing the consumed dispersant due to the cement hydration, so as to maintain the dispersant in the system at the critical micelle state and prevent or reduce the slump loss.

The preparation method of hyperbranched polycarboxylic acid type copolymer cement dispersant disclosed herein comprise: Monomer A, B and C in aqueous medium undergo free radical copolymerization, wherein the molar ratio of Monomer A, B and C shall conform to: B/A=2~10, C/(A+B+C)= 0.02~0.08, where Monomer A is expressed by General Formula (1):

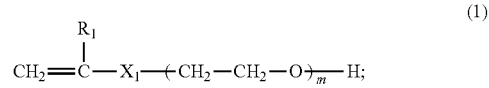

Where, $R_1$ is hydrogen atom or methyl; $X_1$=O, $CH_2O$, $CH_2CH_2O$; m is the average addition moles' number of epoxy ethane, which is an integer from 5 to 200.

Monomer B is expressed by General Formula (2):

Where, $R_2$ represents H or COOM; $R_3$ represents H or $CH_3$; M represents H, Na, K or $NH_4$;

Monomer C is expressed by General Formula (3):

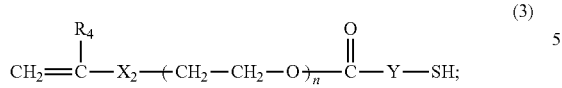
(3)

Where, $R_4$ is hydrogen atom or methyl; $X_2$=O, $CH_2O$, $CH_2CH_2O$; Y=$CH_2$, $CH_2CH_2$, $CH(CH_3)$, $CH_2CH_2CH_2$, $CH(CH_3)CH_2$, $C(CH_3)_2$; n is the average addition moles' number of epoxy ethane, which is an integer from 5 to 200.

A possible structure of the hyperbranched polycarboxylic acid type copolymer cement dispersant in the present invention is as shown in FIG. 1. Monomer C is a sulfhydryl-contained macromonomer. When Monomer C involves a polymerization, the sulfhydryl in its molecular structure enables the transferring of the chain in the polymerization, which allows the sulfhydryl-contained side chain of a comb-shaped polymer chain to connect with the end of the main chain of another comb-shaped polymer chain, thus forming the hyperbranched structure upon many times of such cross-linking.

In the present invention, Monomer A mainly provides a stereo-hindrance effect, thus endowing hyperbranched copolymer with excellent dispersion and slump retention ability. The unsaturated macromonomers expressed by General Formula (1) include polyethylene glycol vinyl ether, polyethylene glycol allyl ether, polyethylene glycol methylallyl ether and 3-methyl-3-butylene-1-polyethylene glycol alcoholic ether. The monomers are not only commercially available, but can be prepared according to the methods stated in the disclosed patents or literatures as well. The monomers can be used singly or in the form of a mixture having two or more constituents mixed at any ratio.

In the present invention, Monomer B mainly provides absorption groups. The monomers expressed by General Formula (2) include acrylic acid, methacrylic acid, maleic acid or, a sodium salt, potassium salt and ammonium salt of acrylic acid, methacrylic acid, and maleic acid.

The monomers are not only commercially available, but also can be can be used singly or in the form of a mixture having two or more constituents mixed at any ratio.

In the present invention, Monomer C is a new-type monomer compound and also a sulfhydryl-contained macromonomer. When Monomer C involves polymerization, the sulfhydryl in its molecular structure enables the transferring of the chain in polymerization, which allows cross-linking among various polymer chains, thus forming the hyperbranched structure. Monomer C expressed by General Formula (3) can be prepared by a esterification of Compound D expressed by General Formula (4) with Compound E expressed by General Formula (5).

Compound D is expressed by General Formula (4):

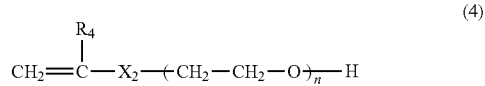
(4)

In General Formula (4), $R_4$ is hydrogen atom or methyl; $X_2$=O, $CH_2O$, $CH_2CH_2O$; n is the average addition moles' number of epoxy ethane, which is an integer from 5 to 200.
Compound E is expressed by General Formula (5):

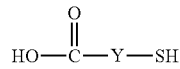
(5)

In General Formula (5), Y=$CH_2$, $CH_2CH_2$, $CH(CH_3)$, $CH_2CH_2CH_2$, $CH_2CH(CH_3)$ or $C(CH_3)_2$.

In the present invention, Compound D expressed by General Formula (4) is selected from one of the following: polyethylene glycol vinyl ether, polyethylene glycol allyl ether, polyethylene glycol methylallyl ether and 3-methyl-3-butylene-1-polyethylene glycol alcoholic ether. The compounds are not only commercially available, but can be prepared according to the methods stated in the disclosed patents or the literatures well as.

In the present invention, Monomer C can be prepared by esterification of Compound D with Compound E. The esterification process has been reported in the prior art, and commonly known by those skilled in this art. Relying on the preparation method, the monoters can be obtained through esterification by using Compound D and Compound E with the presence of a small amount of solvent medium and acid catalyst as well as a tiny amount of polymerization inhibitor. Generally, esterification occurs between Compound D and Compound E with the presence of catalyst and polymerization inhibitor, wherein a slightly overdosed Compound E is necessary to improve the esterification rate, the molar ratio conforms to E/D=1.2~1.5, and the redundant Compound E can be eliminated through extraction, or directly put into the next reaction to adjust the polymer's molecular weight. The dosage of the polymerization inhibitor, namely p-hydroxyphenyl methyl ether, hydroquinoneor phenothiazine or polymerization inhibitor, in the reaction system is 0.02~0.1% of the weight of Compound D, and that of the catalyst, namely concentrated sulfuric acid or p-toluenesulfonic acid or solid superacid, is 2~5% of the total weight of Compound D and Compound E. The temperature shall be limited within the range of 100° C. to 120° C. and time within 12 h to 30 h during the esterification. The polymerization in the present invention shall take place in a water system with redox system as the polymerization initiator. The oxidant in the redox system uses hydrogen peroxide, whose dosage is calculated by the hydrogen peroxide with 100% concentration, taking up 1~4% of the total moles' number of Monomer A+B+C; the reducer in the redox system is selected from sulfite alkali-metal salt, L-ascorbic acid or sodium formaldehyde sulfoxylate, whose dosage takes up 0.5~2% of the total moles' number of Monomer A+B+C. During the implementation of the present invention, add Monomer A and aqueous solution of the oxidant in the redox initiation system into a reaction vessel before initiation of the polymerization, and add Monomer B, Monomer C and aqueous solution of the reducer in the redox initiation system into the reaction vessel by titration before initiation of the reaction.

The present invention is implemented by maintaining a relatively high polymerization concentration from 30% to 60% and a relatively low polymerization temperature from 30° C. to 60° C. The titration time of Monomer B, Monomer C and aqueous solution of the reducer in the redox initiation system shall be controlled within 1 h~4 h. Keep further reaction after the completion of the titration with the duration to be limited within 2 h~4 h. Add an alkaline compound to the reactant to adjust the PH value from 6.0 to 7.0 after polymerization so as to improve the product storage stability. The alkaline compound is a mixture having one or more compounds selected from alkali metal hydroxide, ammonia water and organic amines.

In the present invention, the weight-average molecular weight of the hyperbranched polycarboxylic acid type copolymer cement dispersant is limited within 50,000~140,000. If the molecular weight is too large or small, it will lower the dispersion or the dispersion retention ability of the cement.

When in use, the general dosage of the comb-shaped copolymer cement dispersant occupies 0.08%~0.50% of the total gel materials. If the dosage is less than 0.08%, then the dispersion is far from satisfactory. On the contrary, if more than 0.5%, the overdosed addition is only proved to lead to economic waste without corresponding growth in effects.

Certainly, the comb-shaped copolymer cement dispersant in the present invention may also be mixed with at least one selected from aminosulfonic acid-based water reducer, lignin-based common water reducer and polycarboxylate-based water reducer known in the prior art. In addition to the concrete water reducer, other agents such as air entraining agent, expansion agent, retarder, early strength agent, thickener, shrinkage reducing agent and defoamer may also be added.

The hyperbranched polycarboxylic acid type copolymer cement dispersant prepared as per the methods stated in the present invention, with a relatively low dosage, is conducive to maintaining good dispersion of the cement, relatively high water-reducing rate and favorable slump-keeping ability.

BRIEF DESCRIPTION OF THE DRAWINGS

The molecular structure of the hyperbranched polycarboxylic acid type copolymer cement dispersant is as shown in the schematic diagrams.

DETAILED DESCRIPTION OF THE EMBODIMENTS

The procedure for preparing the polymerization products according to the present invention is further detailed through the embodiments below and these embodiments are given for illustration of rather than limitation to the present invention so that those skilled in this art can understand the present invention and implement it accordingly. Any equivalent changes or modifications without deviating from the spirit of the present invention are within the protection scope of the present invention.

In the embodiments of the present invention, the molecular weight of all the polymers is measured through the aqueous gel permeation chromatography (GPC). The experimental conditions are as follows:
Gel column: concatenation of two Shodex SB806+803 chromatographic columns
Eluent: $NaNO_3$ solution, 0.1 M
Flow phase velocity: 1.0 ml/min
Injection: aqueous solution of 20 µl 0.5%
Detector: Shodex RI-71 Differential Refractive Index Detector
Reference materials: polyethylene glycol GPC reference material (Sigma-Aldrich, molecular weight of 1010000, 478000, 263000, 118000, 44700, 18600, 6690, 1960, 628, 232)

In the application embodiment of the present invention, the cement used is Onada Cement 52.5R.P.II unless otherwise specified, wherein the sand is medium sand with a fineness modulus Mx of 2.6, and the stones adopt macadams of continuous grading whose diameter is from 5 to 20 mm. The fluidity of cement paste is measured on a plate glass by addition of 87 g of water after stirring for 3 min according to GB/T8077-2000. The slump and its loss shall comply with JC473-2001 Concrete Pumping Agent.

The codes for the compounds used in Monomer C's esterification embodiments are shown in Table 1:

TABLE 1

Codes for compounds in esterification embodiments

| Codes | Name of compound | Codes | Name of compound |
|---|---|---|---|
| D-1 | Polyethylene glycol allyl ether (molecular weight 500, $R_4$ = H, $X_2$ = $CH_2O$, n = 11) | E-1 | Thioglycolic acid |
| D-2 | 3-methyl-3-butylene-1-polyethylene glycol alcoholic ether (molecular weight 2000, $R_4$ = $CH_3$, $X_2$ = $CH_2CH_2O$, n = 44) | E-2 | 3-mercapto-propionic acid |
| D-3 | Polyethylene glycol methylallyl ether (molecular weight 5000, $R_4$ = $CH_3$, $X_2$ = $CH_2O$, n = 112) | E-3 | 4-mercapto-butyric acid |

Esterification Embodiments

Esterification Embodiment C-1

Add 50 g of D-1 (0.1 mol), 11.1 g of E-1 (0.12 mol), 1.5 g of p-toluenesulfonic acid, 0.05 g of phenothiazine and 25 g of toluene into a glass flask attached with a stirrer and a water separator, and then keep stirring them and maintain the reaction temperature at 100° C., after 12 h's reaction, cool the temperature of the oil bath to 110° C. and eliminate toluene through decompression and distillation. The final weight of water separated is 1.75 g, and the esterification rate of D-1 is 98.1% measured by means of acid-base titration. To eliminate the unesterified E-1, first neutralize the esterified substances by adding the saturated sodium carbonate solution until the PH value equals to 8, since E-1 converted to salt is insoluble in ethyl acetate, extract the esterified substances with the ethyl acetate and collect the organic phases, afterwards, eliminate the ethyl acetate through decompression and distillation, and lastly dry the obtained solids in the vacuum oven of 50° C. for 10 h to get Monomer C-1.

Esterification Embodiment C-2

Add 200 g of D-2 (0.1 mol), 13.8 g of E-2 (0.13 mol), 8.6 g of p-toluenesulfonic acid, 0.10 g of phenothiazine and 75 g of toluene into a glass flask attached with a stirrer and a water separator, and then keep stirring them and maintain the reaction temperature at 110° C., after 20 h's reaction, cool the temperature of the oil bath to 110° C. and eliminate toluene through decompression and distillation. The final weight of water separated is 1.72 g, and the esterification rate of D-2 is 97.2% measured by means of acid-base titration. To eliminate the unesterified E-2, first neutralize the esterified substances by adding the saturated sodium carbonate solution until the PH value equals to 8, since E-2 converted to salt is insoluble in ethyl acetate, extract the esterified substances with the ethyl acetate and collect the organic phases, afterwards, eliminate the ethyl acetate through decompression and distillation, and lastly dry the obtained solids in the vacuum oven of 50° C. for 10 h to get Monomer C-2.

Esterification Embodiment C-3

Add 500 g of D-3 (0.1 mol), 18.1 g of E-3 (0.15 mol), 26.0 g of p-toluenesulfonic acid, 0.10 g of phenothiazine and 150 g of toluene into a glass flask attached with a stirrer and a water separator, and then keep stirring them and maintain the reaction temperature at 120° C., after 30 h's reaction, cool the temperature of the oil bath to 110° C. and eliminate toluene through decompression and distillation. The final weight of water separated is 1.70 g, and the esterification rate of D-2 is 96.3% measured by means of acid-base titration. To eliminate the unesterified E-2, first neutralize the esterified substances by adding the saturated sodium carbonate solution until the PH value equals to 8, since E-3 converted to salt is insoluble in ethyl acetate, extract the esterified substances with the ethyl acetate, and collect the organic phases, afterwards, eliminate the ethyl acetate through decompression and distillation, and lastly dry the obtained solids in the vacuum oven of 50° C. for 10 h, to get Monomer C-3.

TABLE 2

Codes for monomers in synthesis embodiments and comparative examples

| Code | Name of monomer | Source |
|---|---|---|
| A-1 | Polyethylene glycol allyl ether (molecular weight 1000, $R_1$ = H, $X_1$ = $CH_2O$, m = 22) | Commercially available |
| A-2 | 3-methyl-3-butylene-1-polyethylene glycol alcoholic ether (molecular weight 2000, $R_1$ = $CH_3$, $X_1$ = $CH_2CH_2O$, m = 44) | Commercially available |
| A-3 | Polyethylene glycol methylallyl ether (molecular weight 5000, $R_1$ = $CH_3$, $X_1$ = $CH_2O$, m = 112) | Commercially available |
| B-1 | Acrylic acid | Commercially available |
| B-2 | Methacrylic acid | Commercially available |
| B-3 | Maleic acid | Commercially available |
| C-1 | Thioglycolic acid and esterification product of polyethylene glycol allyl ether (molecular weight 600, $R_4$ = H, $X_2$ = $CH_2O$, Y = $CH_2$, n = 11) | Self prepared |
| C-2 | 3-mercaptopropionic acid and esterification product of 3-methyl-3-butylene-1-polyethylene glycol alcoholic ether (molecular weight 2100, $R_4$ = $CH_3$, $X_2$ = $CH_2CH_2O$, Y = $CH_2CH_2$, n = 44) | Self prepared |
| C-3 | 4-mercaptobutyric acid and esterification product of polyethylene glycol methylallyl ether (molecular weight 5100, $R_4$ = $CH_3$, $X_2$ = $CH_2O$, Y = $CH_2CH_2CH_2$, n = 112) | Self prepared |

Synthesis Embodiments

The codes for monomers listed in Table 2, and the raw materials, proportions and weight concentrations listed in Table 3 are adopted in the synthesis embodiments and the comparative examples.

Synthesis Embodiment 1

Add 100.0 g of A-1 (0.1 mol), 0.68 g of 30% hydrogen peroxide (0.006 mol) and 70.0 g of water into a glass flask attached with a thermometer, a stirrer and a nitrogen inlet tube, heat the mixture to 45° C. with the presence of nitrogen, and then stir it till being dissolved. Add the liquid mixed with 14.4 g of B-1 (0.2 mol), 4.8 g of C-1 (0.008 mol), 0.26 g of L-ascorbic acid (0.0015 mol) and 35.0 g of water by means of titration with a duration of 2 h, and then keep reacting for 2 h at this temperature, afterwards, cool the reactant to the room temperature, and add 24.0 g of 30% NaOH solution for neutralization until the PH value of the reactant equals to 7. The polymer is composed of the aqueous solution of polymer with a weight-average molecular weight of 51000, and the weight concentration of the polymer is 47.5%.

Synthesis Embodiment 2

Add 100.0 g of A-2 (0.05 mol), 0.46 g of 30% hydrogen peroxide (0.004 mol) and 80.0 g of water into a glass flask attached with a thermometer, a stirrer and a nitrogen inlet tube, heat the mixture to 45° C. with the presence of nitrogen, and then stir it till being dissolved. Add the liquid mixed with 10.8 g of B-1 (0.15 mol), 15.33 g of C-2 (0.0073 mol), 0.17 g of L-ascorbic acid (0.001 mol) and 40.0 g of water by means of titration with a duration of 2 h, and then keep reacting for 2 h at this temperature, afterwards, cool the reactant to the room temperature, and add 18.0 g of 30% NaOH solution for neutralization until the PH value of the reactant equals to 7. The polymer is composed of the aqueous solution of polymer with a weight-average molecular weight of 88000, and the weight concentration of the polymer is 49.2%.

Synthesis Embodiment 3

Add 100.0 g of A-3 (0.02 mol), 0.38 g of 30% hydrogen peroxide (0.0033 mol) and 150.0 g of water into a glass flask attached with a thermometer, a stirrer and a nitrogen inlet tube, heat the mixture to 45° C. with the presence of nitrogen, and then stir it till being dissolved. Add the liquid mixed with 4.3 g of B-1 (0.06 mol), 8.2 g of C-3 (0.0016 mol), 0.14 g of L-ascorbic acid (0.0008 mol) and 60.0 g of water by means of titration with a duration of 2 h, and then keep reacting for 2 h at this temperature, afterwards, cool the reactant to the room temperature, and add 7.2 g of 30% NaOH solution for neutralization until the PH value of the reactant equals to 7. The polymer is composed of the aqueous solution of polymer with a weight-average molecular weight of 101000, and the weight concentration of the polymer is 34.7%.

Synthesis Embodiment 4

Add 100.0 g of A-2 (0.05 mol), 0.69 g of 30% hydrogen peroxide (0.006 mol) and 120.0 g of water into a glass flask attached with a thermometer, a stirrer and a nitrogen inlet tube, heat the mixture to 30° C. with the presence of nitrogen, and then stir it till being dissolved. Add the liquid mixed with 21.5 g of B-2 (0.25 mol), 12.6 g of C-2 (0.006 mol), 0.26 g of L-ascorbic acid (0.0015 mol) and 80.0 g of water by means of titration with a duration of 4 h, and then keep reacting for 3 h at this temperature, afterwards, cool the reactant to the room temperature, and add 33.3 g of 30% NaOH solution for neutralization until the PH value of the reactant equals to 7. The polymer is composed of the aqueous solution of polymer with a weight-average molecular weight of 80600, and the weight concentration of the polymer is 39.8%.

Synthesis Embodiment 5

Add 100.0 g of A-2 (0.05 mol), 1.24 g of 30% hydrogen peroxide (0.011 mol) and 100 g of water into a glass flask attached with a thermometer, a stirrer and a nitrogen inlet tube, heat the mixture to 45° C. with the presence of nitrogen, and then stir it till being dissolved. Add the liquid mixed with 43.0 g of B-2 (0.50 mol), 6.6 g of C-1 (0.011 mol), 1.69 g of sodium formaldehyde sulfoxylate (0.011 mol) and 60 g of water by means of titration with a duration of 4 h, and then keep reacting for 3 h at this temperature, afterwards, cool the reactant to the room temperature, and add 58.4 g of 30% NaOH solution for neutralization until the PH value of the reactant equals to 7. The polymer is composed of the aqueous solution of polymer with a weight-average molecular weight of 90500, and the weight concentration of the polymer is 49.8%.

Synthesis Embodiment 6

Add 100.0 g of A-2 (0.05 mol), 0.46 g of 30% hydrogen peroxide (0.004 mol) and 80.0 g of water into a glass flask attached with a thermometer, a stirrer and a nitrogen inlet tube, heat the mixture to 60° C. with the presence of nitrogen, and then stir it till being dissolved. Add the liquid mixed with 17.4 g of B-3 (0.15 mol), 20.4 g of C-3 (0.004 mol), 0.17 g of L-ascorbic acid (0.001 mol) and 45.0 g of water by means of titration with a duration of 1 h, and then keep reacting for 4 h at this temperature, afterwards, cool the reactant to the room temperature, and add 36.0 g of 30% NaOH solution for neutralization until the PH value of the reactant equals to 7. The polymer is composed of the aqueous solution of polymer with a weight-average molecular weight of 82500, and the weight concentration of the polymer is 57.9%.

Synthesis Embodiment 7

Add 100.0 g of 50 g of A-1 (0.05 mol), 50 g of A-2 (0.025 mol), 0.34 g of 30% hydrogen peroxide (0.003 mol) and 80.0 g of water into a glass flask attached with a thermometer, a stirrer and a nitrogen inlet tube, heat the mixture to 45° C. with the presence of nitrogen, and then stir it till being dissolved. Add the liquid mixed with 16.2 g of B-1 (0.225 mol), 25.2 g of C-2 (0.012 mol), 0.26 g of L-ascorbic acid (0.0015 mol) and 60.0 g of water by means of titration with a duration of 2 h, and then keep reacting for 3 h at this temperature, afterwards, cool the reactant to the room temperature, and add 13.0 g of 30% NaOH solution and 16.7 g of triethanolamine for neutralization until the PH value of the reactant equals to 7. The polymer is composed of the aqueous solution of polymer with a weight-average molecular weight of 108000, and the weight concentration of the polymer is 49.5%.

Synthesis Embodiment 8

Add 50.0 g of A-1 (0.05 mol), 50.0 g of A-3 (0.01 mol), 1.09 g of 30% hydrogen peroxide (0.01 mol) and 80.0 g of water into a glass flask attached with a thermometer, a stirrer and a nitrogen inlet tube, heat the mixture to 45° C. with the presence of nitrogen, and then stir it till being dissolved. Add the liquid mixed with 6.5 g of B-1 (0.09 mol), 7.74 g of B-2 (0.09 mol), 43.8 g of C-2 (0.02 mol), 0.68 g of L-ascorbic acid (0.004 mol) and 60.0 g of water by means of titration with a duration of 2 h, and then keep reacting for 2 h at this temperature, afterwards, cool the reactant to the room temperature, and add 21.6 g of 30% NaOH solution for neutralization until the PH value of the reactant equals to 7. The polymer is composed of the aqueous solution of polymer with a weight-average molecular weight of 135000, and the weight concentration of the polymer is 49.3%.

Comparative Example 1

The comparative example corresponds to Synthesis Embodiment 2, wherein the mole of 3-mercaptopropionic acid is used as a substitute for Monomer C: add 100 g of A-2 (0.05 mol), 0.46 g of 30% hydrogen peroxide (0.004 mol) and 80.0 g of water into a glass flask attached with a thermometer, a stirrer and a nitrogen inlet tube, heat to 45° C. with the presence of nitrogen, and then stir it till being dissolved. Add the liquid mixed with 10.8 g of B-1 (0.15 mol), 0.77 g of 3-mercaptopropionic acid (0.0073 mol), 0.17 g of L-ascorbic acid (0.001 mol) and 40.0 g of water by means of titration with a duration of 2 h, and then keep reacting for 2 h at this temperature, afterwards, cool the reactant to the room temperature, and add 18.0 g of 30% NaOH solution for neutralization until the PH value of the reactant equals to 7. This polymer is composed of the aqueous solution of the polymer with a weight-average molecular weight of 32000, and the weight concentration of the polymer is 49.5%.

Comparative Example 2

The comparative example corresponds to Synthesis Embodiment 2, wherein the molar ratio of Monomer C in all monomers is changed to 0.01 (<0.02): add 100 g of A-2 (0.05 mol), 0.46 g of 30% hydrogen peroxide (0.004 mol) and 80.0 g of water into a glass flask attached with a thermometer, a stirrer and a nitrogen inlet tube, heat to 45° C. with the presence of nitrogen, and then stir it till being dissolved. Add the liquid mixed with 10.8 g of B-1 (0.15 mol), 4.2 g of C-2 (0.002 mol), 0.17 g of L-ascorbic acid (0.001 mol) and 40.0 g of water by means of titration with a duration of 2 h, and then keep reacting for 2 h at this temperature, afterwards, cool the reactant to the room temperature, and add 18.0 g of 30% NaOH solution for neutralization until the PH value of the reactant equals to 7. This polymer is composed of the aqueous solution of the polymer with a weight-average molecular weight of 58000, and the weight concentration of the polymer is 47.2%.

Comparative Example 3

The comparative example corresponds to Synthesis Embodiment 2, wherein the molar ratio of Monomer C in all monomers is changed to 0.15 (>0.08): add 100 g of A-2 (0.05 mol), 0.46 g of 30% hydrogen peroxide (0.004 mol) and 100.0 g of water into a glass flask attached with a thermometer, a stirrer and a nitrogen inlet tube, heat to 45° C. with the presence of nitrogen, and then stir it till being dissolved. Add the liquid mixed with 10.8 g of B-1 (0.15 mol), 74.11 g of C-2 (0.035 mol), 0.17 g of L-ascorbic acid (0.001 mol) and 80.0 g of water by means of titration with a duration of 2 h, and then keep reacting for 2 h at this temperature, afterwards, cool the reactant to the room temperature, and add 18.0 g of 30% NaOH solution for neutralization until the PH value of the reactant equals to 7. This polymer is composed of the aqueous solution of the polymer with a weight-average molecular weight of 178000, and the weight concentration of the polymer is 47.2%.

TABLE 3

Synthetic conditions and molecular weights of polymers

| No. | Category and molar ratio of monomers | | | | | Weight concentration/% | $M_w$ |
| --- | --- | --- | --- | --- | --- | --- | --- |
| | A | B | C | B/A | C/(A + B + C) | | |
| Embodiment 1 | A-1 | B-1 | C-1 | 2 | 0.026 | 47.5 | 51000 |
| Embodiment 2 | A-2 | B-1 | C-2 | 3 | 0.035 | 49.2 | 88000 |
| Embodiment 3 | A-3 | B-1 | C-3 | 3 | 0.020 | 34.7 | 101000 |

TABLE 3-continued

Synthetic conditions and molecular weights of polymers

| No. | Category and molar ratio of monomers | | | | | Weight concen- tration/% | $M_w$ |
|---|---|---|---|---|---|---|---|
| | A | B | C | B/A | C/(A + B + C) | | |
| Embodiment 4 | A-2 | B-2 | C-2 | 5 | 0.020 | 39.8 | 80600 |
| Embodiment 5 | A-2 | B-2 | C-1 | 10 | 0.020 | 49.8 | 90500 |
| Embodiment 6 | A-2 | B-3 | C-3 | 3 | 0.020 | 57.9 | 82500 |
| Embodiment 7 | A-1, A-2 | B-1 | C-2 | 3 | 0.041 | 49.5 | 108000 |
| Embodiment 8 | A-1, A-3 | B-1, B-2 | C-2 | 3 | 0.077 | 49.3 | 135000 |
| Comparative Example 1 | A-2 | B-1 | / | 3 | / | 49.5 | 32000 |
| Comparative Example 2 | A-2 | B-1 | C-2 | 3 | 0.010 | 47.2 | 58000 |
| Comparative Example 3 | A-2 | B-1 | C-2 | 3 | 0.150 | 48.7 | 178000 |

Application Embodiments

Application Embodiment 1

The fluidity of cement paste test is carried out in order to evaluate the dispersion and the dispersion retention ability of the hyperbranched polycarboxylic acid type cement dispersant prepared in accordance with GB/T8077-2000. Add 87 g of water into 300 g of the cement, then stir the mixture for 3 min, and then put it on the plate glass for measurement of fluidity of cement paste, and also measure the paste fluidity 1 h later. See Table 4 for the test results.

According to the data in Table 4, the hyperbranched polycarboxylic acid type copolymer prepared as per the present invention with relatively low dosage improves the cement's dispersion and dispersion retention ability. It is concluded from Comparative Embodiment 2 and Comparative Example 1 that, under the same initial fluidity of net cement, the dosage of a hyperbranched copolymer is 25% lower than that of a simple comb-shaped polymer, and the hyperbranched copolymer has better fluidity retention ability, while the paste fluidity of the comb-shaped polymer drops after 1 h. It is concluded from Comparative Embodiment 2 and Comparative Example 2 and 3 that, effective hyperbranched structure cannot be formed under low ratio of Monomer C, and the paste fluidity retention ability is weak at this time; when the ratio of Monomer C is over high, the molecular weight of the hyperbranched copolymer is over large, and the absorption on the cement particles is affected, so a relatively high dosage is required to reach the same initial fluidity of net cement with that in Embodiment 2, but it still of good fluidity retention ability. It is discovered from the comparisons above that the hyperbranched polycarboxylic acid type copolymer cement dispersant prepared as per the present invention can achieve desirable cement dispersion, and favourable dispersion retention ability.

TABLE 4

Fluidity of cement paste

| No. | Dosage/% | Fluidity of cement paste/mm | |
|---|---|---|---|
| | | 0 min | 60 min |
| Embodiment 1 | 0.15 | 225 | 235 |
| Embodiment 2 | 0.15 | 255 | 275 |
| Embodiment 3 | 0.15 | 235 | 295 |
| Embodiment 4 | 0.15 | 240 | 260 |
| Embodiment 5 | 0.15 | 245 | 275 |
| Embodiment 6 | 0.15 | 235 | 290 |
| Embodiment 7 | 0.15 | 265 | 280 |
| Embodiment 8 | 0.15 | 230 | 250 |
| Comparative Example 1 | 0.20 | 255 | 205 |
| Comparative Example 2 | 0.18 | 250 | 215 |
| Comparative Example 3 | 0.30 | 255 | 280 |

Application Embodiment 2

The application embodiment, by using the hyperbranched polymer formed as per Embodiment 2, investigates the slump retention ability of the hyperbranched polymer under high temperature. It is relatively easy for the concrete with a high fluidity to retain the slump, while the concrete with a medium or a low fluidity puts a higher requirement for the slump retention ability, thus it is of great practical significance to test the slump retention ability of the concrete with a medium or a low fluidity under high temperature. The mixing proportion of the tested concrete is $C:F:S:G_{big}:G_{small}:W=290:60:756:680:453:175$, wherein, C: cement, F: fly ash, S: sand, $G_{big}$: big stone, $G_{small}$: small stone. Control the initial slump between 13 and 15 cm by adjusting the dosage of the water reducer, and measure the slump loss after 30 min and 60 min respectively. See Table 5 for the test results.

TABLE 5

Variations of slump of low-fluidity concrete over time (test temperature: 30° C.)

| No. | Dosage/% | Slump loss along time/cm | | |
|---|---|---|---|---|
| | | 0 min | 30 min | 60 min |
| Embodiment | 0.15 | 14.2 | 15.5 | 14.8 |
| Comparative Example 1 | 0.20 | 14.5 | 9.2 | 6.5 |
| Comparative Example 2 | 0.18 | 14.8 | 10.9 | 8.6 |
| Comparative Example 3 | 0.30 | 14.2 | 15.5 | 16.0 |

The test results indicate that the slump loss of the concrete mixed with the polymer prepared as per Comparative Example 1 is great under high temperature over time, specifically, more than 50% after 60 min. The slump loss of the concrete mixed with the polymer prepared as per Comparative Example 2 is great under high temperature over time, specifically, more than 40% after 60 min. The concrete mixed with the polymer prepared as per Comparative Example 3 has desirable slump retention ability under high temperature over time but requires high dosage. Comparing with the concrete mixed with the polymer prepared as per Embodiment 2, it has desirable slump retention ability under high temperature and requires low dosage. Therefore, it can be concluded that the concrete mixed with the hyperbranched polymer prepared as per the present invention possesses longer-time slump retention ability

What is claimed is:

1. A preparation method of hyperbranched polycarboxylic acid containing copolymer cement dispersant, characterized in that Monomer A, B and C undergo the free radical copolymerization in the aqueous medium, wherein the molar ratio of Monomer A, Monomer B and Monomer C shall conform to: B/A=2~10, C/(A+B+C)=0.02~0.08, where Monomer A is expressed by General Formula (1):

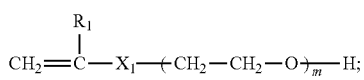
(1)

Where, $R_1$ is hydrogen atom or methyl; $X_1O$, $CH_2O$, $CH_2CH_2O$; m is the average addition mole number of epoxy ethane, which is an integer from 5 to 200.

Monomer B is expressed by General Formula (2):

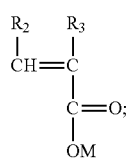
(2)

Where, $R_2$ represents H or COOM; $R_3$ represents H or $CH_3$; M represents H, Na, K or $NH_4$;

Monomer C is expressed by General Formula (3):

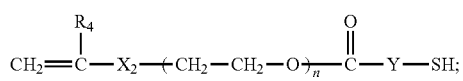
(3)

Where, $R_4$ is hydrogen atom or methyl; $X_2=O$, $CH_2O$, $CH_2CH_2O$; $Y=CH_2$, $CH_2CH_2$, $CH(CH_3)$, $CH_2CH_2CH_2$, $CH(CH_3)CH_2$, $C(CH_3)_2$; n is the average addition mole number of epoxy ethane, which is an integer from 5 to 200.

2. The preparation method of hyperbranched polycarboxylic acid containing copolymer cement dispersant as claimed in claim 1, characterized in that Monomer A is selected from at least one of the following: polyethylene glycol vinyl ether, polyethylene glycol allyl ether, polyethylene glycol methylallyl ether and 3-methyl-3-butylene-1-polyethylene glycol alcoholic ether.

3. The preparation method of hyperbranched polycarboxylic acid containing copolymer cement dispersant as claimed in claim 1, characterized in that Monomer B is selected from at least one of the following: acrylic acid, methacrylic acid, maleic acid, or a sodium, potassium or ammonium salt of acrylic acid, methacrylic acid, and maleic acid.

4. The preparation method of hyperbranched polycarboxylic acid containing copolymer cement dispersant as claimed in claim 1, characterized in that Monomer C is prepared by esterification of Compound D with Compound E;

Compound D is expressed by General Formula (4):

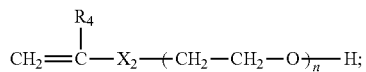
(4)

Compound E is expressed by General Formula (5):

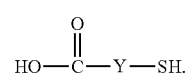
(5)

5. The preparation method of hyperbranched polycarboxylic acid containing copolymer cement dispersant as claimed in claim 4, characterized in that Compound D is selected from one of the following: polyethylene glycol vinyl ether, polyethylene glycol allyl ether, polyethylene glycol methylallyl ether and 3-methyl-3-butylene-1-polyethylene glycol alcoholic ether.

6. The preparation method of hyperbranched polycarboxylic acid containing copolymer cement dispersant as claimed in claim 4, characterized in that Compound D and Compound E with the presence of the catalyst and the polymerization inhibitor undergo the esterification, wherein, the molar ratio of Compound E to D conforms to e/d=1.2~1.5, and the dosage of the polymerization inhibitor, namely p-hydroxyphenyl methyl ether, hydroquinone or phenothiazine, in the reaction system is 0.02~0.1% of the weight of Compound D; and that of the catalyst, namely concentrated sulfuric acid, p-toluenesulfonic acid or solid superacid, in the reaction system is 2~5% of the total weight of Compound D and Compound E; the temperature shall be limited within the range of 100° C. to 120° C. and time within 12 h to 30 h during the esterification.

7. The preparation method of hyperbranched polycarboxylic acid containing copolymer cement dispersant as claimed in any one of claims 1-6, characterized in that the polymerization takes the redox system as the polymerization initiator, and the oxidant in the redox system uses the hydrogen peroxide, whose dosage is calculated by the hydrogen peroxide with 100% concentration, taking up 1~4% of the total moles' number of Monomer A+B+C; the reducer in the redox system is selected from sulfite alkali-metal salt, L-ascorbic acid or sodium formaldehyde sulfoxylate, whose dosage takes up 0.5~2% of the total moles' number of Monomer A+B+C.

8. The preparation method of hyperbranched polycarboxylic acid containing copolymer cement dispersant as claimed in claim 7, characterized in that: add Monomer A and aqueous solution of the oxidant in the redox initiation system into a reaction vessel before initiation of the polymerization, and add Monomer B, Monomer C and aqueous solution of the reducer in the redox initiation system into the reaction vessel by titration with the duration of 1 h to 4 h before initiation of the reaction.

9. The preparation method of hyperbranched polycarboxylic acid containing copolymer cement dispersant as claimed in claim 8, characterized in that, during the polymerization, the mass concentration of the monomer is 30~60%, and the polymerization temperature is from 30° C. to 60° C., and keep further reaction after the completion of the titration with the duration of 2 h to 4 h.

10. The preparation method of hyperbranched polycarboxylic acid containing copolymer cement dispersant as claimed in any one of claims 1-6, characterized in that the weight-average molecular weight of hyperbranched polycarboxylic acid type copolymer cement dispersant is 50,000~140,000.

\* \* \* \* \*